A. H. SEYFERTH.
Pyrometer.
No. 217,822.                    Patented July 22, 1879.
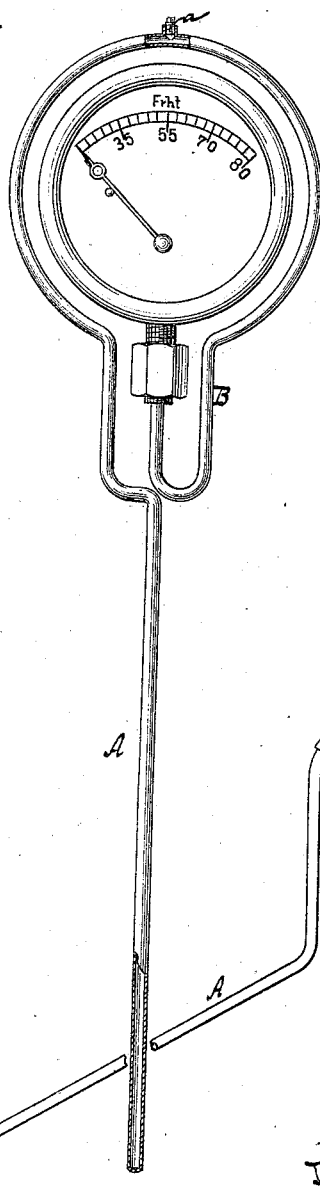
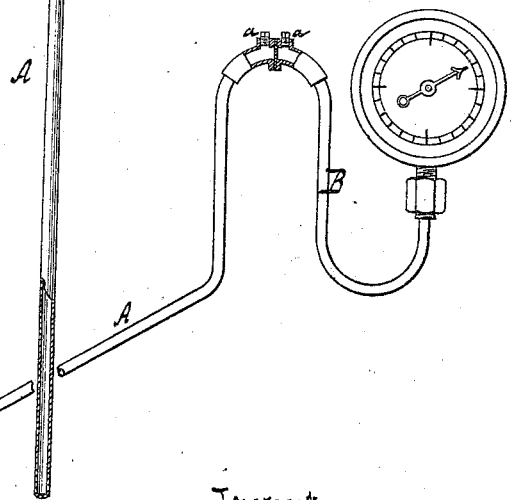

UNITED STATES PATENT OFFICE.

AUGUSTUS H. SEYFERTH, OF BRUNSWICK, GERMANY.

IMPROVEMENT IN PYROMETERS.

Specification forming part of Letters Patent No. 217,822, dated July 22, 1879; application filed April 23, 1879.

*To all whom it may concern:*

Be it known that I, AUGUSTUS H. SEYFERTH, of Brunswick, in the Empire of Germany, have invented a new and useful Improvement in Pyrometers and Thermometers, which Improvement is fully set forth in the following specification, reference being had to the accompanying drawings, in which—

Figure 1 represents a front view, partly in section. Fig. 2 is a similar view of a modification thereof.

Similar letters indicate corresponding parts.

This invention consists in the combination, with a manometer, of a hollow leg which is closed at the bottom, a curved tube or siphon which connects at one end with the hollow leg, and at its opposite end with the manometer, an opening through which the hollow leg and also the curved tube or siphon can be charged with the liquid, and a scale on the manometer which is divided off to indicate the temperature corresponding to the tension of the saturated vapors emanating from the liquid in the hollow leg at such temperature, so that by inserting said hollow leg into a space the temperature existing in said space can be read off from the scale of the manometer.

The operation of my pyrometer or thermometer depends upon the quality of saturated vapors—*i. e.*, of such vapors which are still in contact with the liquid from which they are produced; that the tension of such saturated vapors bears a fixed and easily determined relation to the temperature of the liquid from which they emanate. At the same time the temperature of the liquid contained in a closed tube or vessel depends upon the temperature of the space surrounding said tube. If, therefore, a closed tube or vessel of any suitable material is partially filled with a liquid—such, for instance, as mercury—so that the quantity of this liquid is sufficient to fill the remaining space of said tube with the saturated vapors corresponding to the existing temperature, and if said tube is connected with a manometer, the temperature of the surrounding space can be readily ascertained from the position of the index of the manometer.

In the drawings, the letter A designates a hollow leg or tube, which is partially filled with mercury or any other suitable liquid, as will be presently more fully explained. This leg connects at its open end with a curved tube or siphon, B, which is in direct connection with the manometer C, and which is filled with mercury or any other suitable liquid, so that when the instrument is used the heated vapors formed at high temperatures in the leg A will not come in contact with the working parts of the manometer.

At the junction of the siphon B and the leg A is an opening, *a*, through which the liquid or liquids are introduced, and which can be closed by a suitable plug. If the leg A and the siphon B are to be charged with different liquids, two openings, *a a*, may be provided, which are separated from each other by a movable diaphragm, as is indicated in Fig. 2, so as to prevent the mixing of the liquids while the instrument is being charged.

The manometer may be constructed with a curved tube, or with an elastic diaphragm, or in any manner suitable for my purpose; and it is provided with an index and a scale to indicate the temperature corresponding to the tension of the saturated vapors formed in the leg A.

My instrument can be used for measuring the following temperatures:

1. From −65° centigrade to +12.5° centigrade by charging the leg A with liquid carbonic acid, the siphon B being filled with mercury. The scale of the manometer runs from 0 atmospheres (−65° centigrade) to 50 atmospheres, (+12.5° centigrade.)

2. From −10° centigrade to +100° centigrade by charging the leg A with anhydrous sulphurous acid, the siphon B being charged with mercury. The scale of the manometer runs from 0 atmospheres (−10° centigrade) to 20 atmospheres, (+100° centigrade.)

3. From +35° centigrade to +120° centigrade by charging the leg A with anhydrous ethylic ether, the siphon B being charged with mercury. The scale of the manometer runs from 0 atmospheres (+35° centigrade) to 12 atmospheres, (+120° centigrade.)

4. From +100° centigrade to +226° centigrade by charging the leg A and also the siphon B with distilled water. The scale of the manometer runs from 0 atmospheres to 25 atmospheres, (+226° centigrade.)

5. From +216° centigrade to +360° centigrade by charging the leg A and also the siphon B with heavy petroleum, (boiling-point at 216°.) The scale of the manometer runs from 0 atmospheres to 50 atmospheres, (+360° centigrade.)

6. From +357° centigrade to +760° centigrade by charging the leg A and the siphon B with mercury. The scale of the manometer runs from 0 atmospheres to 100 atmospheres, (+755° centigrade;) or, if the scale of the manometer is to indicate only temperatures from 357° to 514°, it runs from 0 to 10 atmospheres, and to obtain a scale showing temperatures from 357° to 668° it runs from 0 to 45 atmospheres.

Instead of the liquids above named all other liquids may be used which have their boiling-points below the temperatures to be measured, and do not become decomposed by the heat or by contact with the walls of the leg.

The leg A may be brought in a vertical position, as shown in Fig. 1, or in an inclined position, as shown in Fig. 2, and the instrument, as above described, may be connected to a vacuum-meter in order to determine the temperature and the degree of vacuum in a vacuum-pan, and if the composition of the boiling mass is known its drying substance can be ascertained.

My instrument can be introduced into the water of a steam-boiler in order to measure the temperature of the water, and it can be connected to an alarm, which is sounded when the temperature of the water reaches a certain limit, so as to indicate the fact that the water begins to be superheated. At the same time the pressure of the steam in the boiler can be ascertained.

It is obvious that the construction of my instrument admits of great variety of modifications.

What I claim as new, and desire to secure by Letters Patent, is—

The combination, with a manometer, of a hollow leg which is closed at the bottom, a curved tube or siphon which connects at one end with the hollow leg and at its opposite end with the manometer, an opening through which the hollow leg and also the siphon can be charged with liquid, and a scale on the manometer which is divided off to indicate the temperature corresponding to the tension of the saturated vapors emanating from the liquid in the hollow leg at such temperature, substantially as and for the purpose set forth.

In testimony that I claim the foregoing I hereunto set my hand and seal this 3d day of March, 1879.

DR. AUGUSTUS H. SEYFERTH. [L. S.]

Witnesses:
WILLIAMS C. FOX,
JOHS. KRACKE.